United States Patent Office 2,704,767
Patented Mar. 22, 1955

2,704,767

DIURETICALLY ACTIVE ADDITION COMPOUNDS OF MERCURY SALTS TO N-ALKYL SULFONAMIDES

Gustav Ehrhart, Am Burgberg, Bad Soden (Taunus), Heinrich Ruschig, Bad Soden (Taunus), and Heinrich Leditschke, Frankfurt am Main, Germany, assignors to Farbwerke Hoechst Aktiengesellschaft vormals Meister Lucius und Bruning, Frankfurt, Germany, a company of Germany No Drawing. Application January 26, 1953, Serial No. 333,336

Claims priority, application Germany February 1, 1952

6 Claims. (Cl. 260—397.7)

This invention relates to mercury compounds suitable as diuretics and a process of preparing them.

Nearly all mercury compounds used as diuretics in modern medicine are compounds which are obtained by the addition of mercury salts on allylamides of aliphatic, aromatic, hydroaromatic, or heterocyclic carboxylic acids in water or methanol, the solvent taking part in the reaction. Further known diuretics are the derivatives of N-allyl-urea which carry a lower aliphatic acyl radical at the N'-nitrogen atom.

Now, we have found that mercury compounds useful in therapeutics can be obtained by mercurizing an aromatic allylamide of the general formula

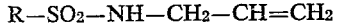

$R-SO_2-NH-CH_2-CH=CH_2$ in which R represents an aromatic radical substituted by one or more groups imparting solubility in water, in the presence of water or compounds which contain hydroxyl groups linked to an aliphatic chain.

As starting materials aromatic N-allyl sulfonamides are used which can be obtained, for instance, by reacting the corresponding sulfochlorides with allylamine, for example, 1-carboxybenzene-3-sulfonic acid-allylamide, 1.2-dicarboxybenzene-4-sulfonic acid-allylamide, 1-β-carboxy-propionyl-aminobenzene-4-sulfonic acid-allylamide, and the like. As compounds containing hydroxyl groups linked to an aliphatic chain there may be mentioned, for instance: water, monohydric or polyhydric aliphatic alcohols, such as methanol, ethanol, propanol, benzyl alcohol, tartaric acid diethyl ester, formyl succinic acid diethyl ester and the like. Especially useful solvents are the lower polyhydric aliphatic alcohols with up to four carbon atoms, such as ethylene glycol, 1.2-propylene glycol, 1.3-butylene glycol, 1.4-butylene glycol, and glycerol.

Mercurization is carried through by means of a mercury salt, for instance, mercuric tartrate, mercuric lactate, mercuric nitrate, preferably mercuric acetate, or the like. There can also be used the products obtained by addition of mercury salts on unsaturated compounds, for example, of mercuric acetate on cinnamic acid methyl ester. Mercurization can be carried through at room temperature as well as at a raised temperature. It is advantageous to operate at temperatures between 50° C. and 150° C., particularly if compounds containing several hydroxyl groups are used as solvents.

The compounds obtained according to the process of the present invention are highly effective diuretics. Compared with the known compounds, the mercurization products of the aromatic N-allyl sulfonamides are distinguished by a less strong alkaline reaction and, consequently, a less irritating effect.

The following examples serve to illustrate the invention, but they are not intended to limit it thereto, the parts being by weight unless otherwise stated; the parts by weight and the parts by volume are related to each other as are kilograms to liters:

Example 1

24 parts of 1-carboxybenzene-3-sulfonic acid-allylamide obtained by reacting 1-carboxybenzene-3-sulfonic acid chloride with allylamine are heated on the steam bath for 4 hours with 30 parts of mercuric acetate in 200 parts of ethylene glycol. The reaction mixture is filtered, and the filtrate is caused to drop into 1000 parts of water. The flocculent precipitate formed is digested several times with 1000 parts of water each time and filtered off with suction. The product obtained is dissolved in 60 parts by volume of 2 N-caustic soda solution, filtered and introduced drop by drop into 60 parts by volume of 2 N-sulfuric acid. After filtering off with suction, washing and drying in an exsiccator, 22 parts of N-[(γ-hydroxy-mercuric-β-hydroxyethoxy)-propyl] - m - sulfamido - benzoic acid-anhydride are obtained.

Example 2

24 parts of 1-carboxybenzene-3-sulfonic acid-allylamide, 30 parts of mercuric acetate and 200 parts of propylene glycol are reacted as described in Example 1. 21.2 parts of N-[(γ-hydroxy-mercuric - β - hydroxy-propoxy)-propyl]-m-sulfamido-benzoic acid are obtained.

Example 3

24 parts of 1-carboxybenzene-3-sulfonic acid-allylamide and 30 parts of mercuric acetate in 200 parts by volume of glycerol are reacted, as described in Example 1. 12.4 parts of N-[(γ-hydroxy-mercuric-β-dihydroxy-propoxy)-propyl]-m-sulfamido-benzoic acid are obtained.

Example 4

15.6 parts of 1-β-carboxy-propionyl-aminobenzene-4-sulfonic acid-allylamide, which can be obtained, for instance, by heating sulfanilic acid allylamide and succinic acid anhydride, are heated for 4 hours on the steam bath with 15 parts of mercuric acetate in 100 parts by volume of ethylene glycol. After filtration, the reaction mixture is poured into 500 parts of water. After being allowed to stand for one night, the water is separated by decanting from the sirupy mass, and the latter is again digested with 500 parts by volume of water. After decanting, the sirupy mass is dissolved in the heat in 25 parts by volume of 2 N-caustic soda solution, filtered and added dropwise to a mixture of 4 parts by volume of glacial acetic acid and 500 parts by volume of water. The precipitate is filtered off with suction, well washed with water and dried in an exsiccator. 15 parts of 1-β-carboxy-propionyl-amino-phenyl-4-sulfonic acid-(γ-hydroxy-mercuric-β-hydroxy-ethoxy)-propylamide are obtained.

Example 5

15.6 parts of 1-β-carboxy-propionyl-aminobenzene-4-sulfonic acid-allylamide are heated for 6 hours on the steam bath with 15 parts of mercuric acetate and 100 parts of propylene glycol and then treated as described in Example 4. 11.5 parts of 1-β-carboxy-propionyl-aminophenyl-4-sulfonic acid-(γ-hydroxy-mercuric - β - hydroxy-propoxy)-propylamide are obtained.

Example 6

15.6 parts of 1-β-carboxy-propionyl-aminobenzene-4-sulfonic acid allylamide are heated for 4 hours on the steam bath with 15 parts of mercuric acetate in 100 parts of glycerol and then treated as described in Example 4. 12 parts of 1-β-carboxy-propionyl-amino-phenyl-4-sulfonic acid-(γ-hydroxy-mercuric-β-[2'.β'-dihydroxy - propoxy])-propylamide are obtained.

Example 7

15.6 parts of 1-β-carboxy-propionyl-aminobenzene-4-sulfonic acid-allylamide are treated with 15 parts of mercuric acetate and 100 parts of 1.3-butylene glycol as described in Example 4 and then worked up. 14.5 parts of 1-β-carboxy-propionyl-aminophenyl-4-sulfonic acid-(γ-hydroxy-mercuric-β-3'-hydroxy-butoxy) - propylamide are obtained.

Example 8

15.6 parts of 1-β-carboxy-propionyl-amino-4-sulfonic acid-allylamide are dissolved, while hot, in 2000 parts by volume of water, and a solution of 20.4 parts of α-acetoxy-mercuric-β-methoxy-hydrocinnamic acid-methyl ester in 1000 parts by volume of water is added. The mixture is heated on the steam bath for 5 hours, and the liquid is poured off from the precipitated oil which solidifies when treated with cold water. The solid product is dissolved in 25 parts by volume of 2 N-caustic soda solution, the solution obtained is then filtered through a hardened filter, and the filtrate is introduced into a mixture of 4 parts by volume of glacial acetic acid and 500 parts by volume of water. The resultant colorless precipitate is filtered off with suction, well washed with water and dried in an exsiccator. 18.8 parts of 1-β-carboxy-propionyl-aminophenyl-4-sulfonic acid-(γ-hydroxy-mercuric-β-hydroxy)-propylamide are obtained.

We claim:

1. The compound of the formula

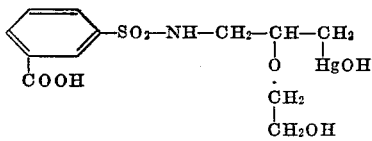

2. The compound of the formula

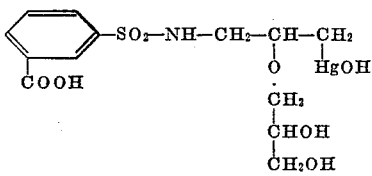

3. The compound of the formula

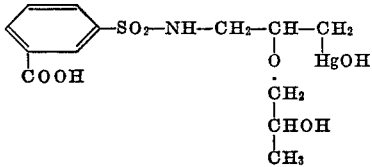

4. The compound of the formula

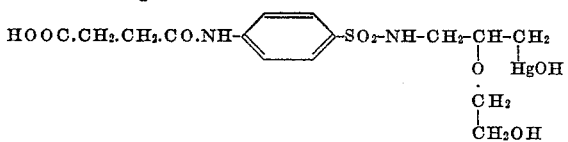

5. The compound of the formula

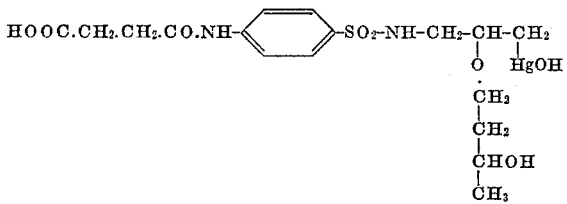

6. Compounds of the general formula

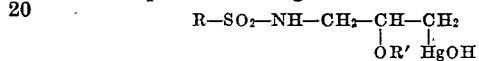

in which R stands for a phenyl radical which is substituted by a member selected from the group consisting of a carboxylic group in position 3 and a β-carboxy-propionyl-amino residue in position 4 and in which R' stands for a lower hydroxy alkyl radical.

References Cited in the file of this patent

UNITED STATES PATENTS

| | | |
|---|---|---|
| 2,117,901 | Molnar | May 17, 1938 |
| 2,315,817 | Ruzicka | Apr. 6, 1943 |

OTHER REFERENCES

Rowland et al.: J. Am. Chem. Soc., vol. 72, pp. 3595–98, August 1950.

Shukis et al.: J. Am. Chem. Soc., 65, pp. 2365–6, December 1943.